United States Patent
Edwards et al.

(10) Patent No.: US 6,260,967 B1
(45) Date of Patent: Jul. 17, 2001

(54) PROGRESSIVE LENS

(75) Inventors: Simon John Edwards, St. Peters; Saulius Raymond Varnas, Brighton, both of (AU); David H. Sklar, San Francisco, CA (US)

(73) Assignee: Sola International Holdings Ltd., Lonsdale (AU)

( * ) Notice: Subject to any disclaimer, the term of this patent is extended or adjusted under 35 U.S.C. 154(b) by 0 days.

(21) Appl. No.: 09/486,978
(22) PCT Filed: Sep. 9, 1998
(86) PCT No.: PCT/AU98/00733
§ 371 Date: May 18, 2000
§ 102(e) Date: May 18, 2000
(87) PCT Pub. No.: WO99/13374
PCT Pub. Date: Mar. 18, 1999

(30) Foreign Application Priority Data

Sep. 9, 1997 (AU) .................................................. PO 9031

(51) Int. Cl.[7] .................................................. G02C 7/06
(52) U.S. Cl. .......................... 351/169; 351/172; 351/177
(58) Field of Search .................................. 351/168, 169, 351/170, 171, 172, 177, 176

(56) References Cited

U.S. PATENT DOCUMENTS

| | | | |
|---|---|---|---|
| 5,444,503 | 8/1995 | Kelch et al. | 351/169 |
| 5,771,089 | 6/1998 | Barth | 351/169 |
| 5,805,260 | 9/1998 | Roffman et al. | 351/176 |
| 6,123,422 | * 9/2000 | Menezes et al. | 351/169 |

FOREIGN PATENT DOCUMENTS

| | | |
|---|---|---|
| 0295849 | 12/1988 | (EP) . |
| 09/12338 | 10/1990 | (WO) . |

* cited by examiner

*Primary Examiner*—Scott J. Sugarman
(74) *Attorney, Agent, or Firm*—Burns, Doane, Swecker & Mathis, L.L.P.

(57) ABSTRACT

A progressive ophthalmic lens element having a front surface that includes an upper viewing zone having a surface power suitable for distance vision, a lower viewing zone having a surface power suitable for near vision, and a corridor of relatively low astigmatism connecting the upper and lower viewing zones, the corridor being a part of an intermediate viewing zone having a surface power varying from that of the upper viewing zone to that of the lower viewing zone. The progressive ophthalmic lens element also has a back surface. The invention is then characterized by the front surface including at least one correction to improve optical performance of the lens element by at least partially compensating for a cylinder correction applied to, or to be applied to, the backsurface.

25 Claims, 3 Drawing Sheets

6.85 D Base 2.00 D Add

Corrected Progressive Lens (b)

PROGRESSIVE LENS

FIELD OF INVENTION

Figure 1:
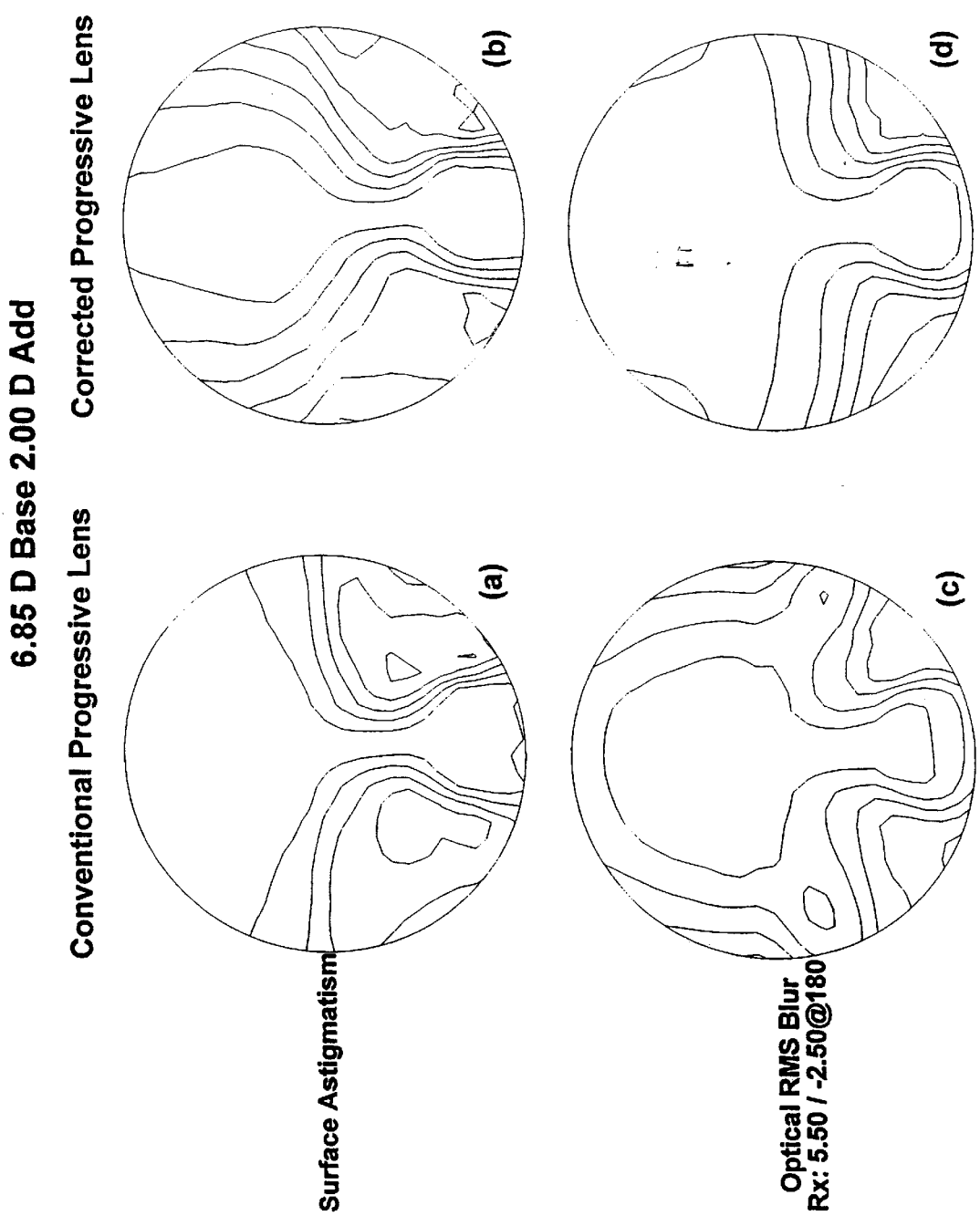

The present invention relates to a progressive ophthalmic lens and in particular to the improvement of the progressive lens surface to compensate for cylinder correction applied to the non-progressive surface.

BACKGROUND OF INVENTION AND OBJECTS

Numerous progressive lenses are known in the prior art. Progressive lenses are typically designed to have distance, near and intermediate viewing zones where the intermediate zone joins the near and distance zones in a cosmetically acceptable way, such that no discontinuities in the lens are visible to people observing the wearer.

Significant advances in customising progressive lens design have been disclosed in international patent application PCT/EP97/00105. This application describes a series of lens elements where the progressive designs vary depending on whether the wearer is a myope (short-sighted), emmetrope (normal vision) or hyperope (long sighted), whilst maintaining substantially constant the optical field of vision in the near and/or distance zones.

Whilst these designs are a significant advance, they do not vary with the specific optical requirements of the individual wearer. For example, the designs do not vary when an astigmatic correction is introduced to the back surface of the lens.

It is an object of the present invention to provide a progressive ophthalmic lens that compensates for optical corrections introduced for individual wearers.

SUMMARY OF INVENTION

The present invention provides a progressive ophthalmic lens element having a front surface that includes an upper viewing zone having a surface power suitable for distance vision, a lower viewing zone having a surface power suitable for near vision, and a corridor of relatively low astigmatism connecting the upper and lower viewing zones, the corridor being a part of an intermediate viewing zone having a surface power varying from that of the upper viewing zone to that of the lower viewing zone. The progressive ophthalmic lens element also has a back surface. The present invention is then characterised by the front surface including at least one correction to improve optical performance of the lens element by at least partially compensating for a cylinder correction applied to, or to be applied to, the back surface.

In this respect, the present invention has identified that in order to satisfy the requirements of various wearers, including for example wearers requiring astigmatic correction, it is necessary to consider the effects of both front and back surfaces in optical performance, and to modify the front surface to improve optical performance in response to, or in anticipation of, the back surface design. By the term "astigmatic correction", we mean the wearer's prescribed cylinder correction and the associated axis of this correction.

The improvement in optical performance is preferably an optimisation of the optical field of vision of the wearer in one or more of the upper, lower or intermediate viewing zones. This improvement, or optimisation, may be relative to an idealised lens element with zero cylinder, or may involve the creation of a new modified progressive lens surface.

By the term "optical field of vision" we mean a field defined by the boundary at which blur becomes apparent to the wearer. The optical field of vision is thus an area or object field viewed from the standpoint of the wearer, in which there is foveal vision with minimal loss of acuity. The size of the optical field of vision is influenced by the size of the lens zone, the net magnification in that zone, and the oblique aberration of the lens.

By the term "lens element" we mean all forms of individual refractive optical bodies employed in the ophthalmic arts, including, but not limited to, lenses, lens wafers and semi-finished lens blanks requiring further finishing to a particular patient's prescription. Also included are formers used in the manufacture of progressive glass lenses and moulds for the casting of progressive lenses in polymeric material such as the material sold under the trade designation CR39.

GENERAL DESCRIPTION OF THE INVENTION

In the ophthalmic lens element of the present invention, the progressive front surface may be created by taking any suitable conventional progressive surface and modifying it according to an optical optimisation process which considers the cylindrical correction applied to the rear surface. The resulting front surface may differ from conventional progressive designs in that the distance and/or near measurement points thereon may not be spherical.

The ophthalmic lens element may exhibit differing corrections in at least two regions of the progressive front surface, corresponding to the differing prescription requirements in the distance and near regions. In a preferred form, the front surface correction will at least partially compensate for a range of cylinder prescriptions. For example, the front surface correction may vary depending on the axis of the cylinder correction on the back surface. In particular, the front surface correction may cover a range of axis values, for example −20° to 20°, depending on the degree of optimisation required, or alternatively the design may involve a specific axis and cylinder.

Alternatively, or additionally, the front surface correction may vary depending on the distance prescription power, or may cover a range of distance prescription powers. Further still, the front surface correction may vary depending on the addition power.

There are a number of methods that may be used to achieve the front surface corrections referred to above. The most preferred of these is a general aspheric modification as it would allow for the modification to be applied to any existing progressive design. In this respect, by the term "general aspheric" we mean a non-rotationally symmetric aspheric surface that may or may not have one or two planes of symmetry.

For a general aspheric modification, a lens corresponding to the single vision prescription case is initially considered and an optimised front surface design created to produce optimal optical performance with a toric back surface. After the modification, the resulting surface may be a generally aspheric. This surface may then be used to replace the base curve of the progressive lens surface to produce a new modified surface, improving the optical performance of the lens for the complete prescription of the wearer This method may be highly automated and utilised with any conventional progressive lens front surface to provide the corrections for a range of prescription, addition power, cylinder and axis orientation values.

As a further alternative, the progressive surface may be designed utilising optical optimisation methods from the initial stages of a progressive surface development. The optical optimisation methods consist of the minimisation of a blur measure, M, and applying any of the known finite element methods. This may be achieved by using an appropriate back surface for the prescription identified, and then designing a dedicated front surface. In this respect, the optical performance may be optimised for one or more of distance, intermediate, or near zone vision, depending on the prescription needs of the wearer.

By the term "blur measure M" we mean a value M defined by one of the following:

$$M_1 = \sum_\theta (\text{rms blur})_\theta^2$$

$$M_2 = \sum_\theta ((mpe)^2 + (cyl\ error)^2)_\theta$$

$$M_3 = \sum_\theta \left(\frac{1}{16}(mpe)^2 + (cyl\ error)^2\right)_\theta$$

$$M_4 = \sum_0^{horizontal} (\varepsilon_{11})_\theta^2 + \sum_8^{vertical} (\varepsilon_{22})_\theta^2 + \sum_\theta^{oblique} (mpe)_\theta^2$$

$$M_5 = \sum_\theta \left((mpe)^2 + \frac{1}{16}(cyl\ error)^2\right)_\theta$$

where summations are over a number of sample eye rotations θ. In the case of $M_4$, there are different blur measures used depending upon whether the sample point 0 represents a horizontal, vertical, or oblique rotation from the "straight ahead" position. This mode may provide some generalisation of the aspheric "minimum tangential error" design strategy. The modes $M_3$ and $M_5$ represent "minimum cyl error" and "minimum mean power error" strategies respectively.

Additionally, optical blur may be measured in a number of ways. For instance, a number of measures of "optical blur" may be defined, such as:

$$\text{mean power error }(mpe) = \frac{\varepsilon_{11} + \varepsilon_{22}}{2}$$

$$cyl\ error = ((\varepsilon_{11} - \varepsilon_{22})^2 + 4\varepsilon_{12}^2)^{1/2}$$

$$\text{rms blur} = \left(\frac{\varepsilon_{11}^2 + 2\varepsilon_{12}^2 + \varepsilon_{22}^2}{2}\right)^{1/2}$$

$$= \left((mpe)^2 + \frac{1}{4}(cyl\ error)^2\right)^{1/2}$$

where ε is the focal error matrix and may be written $$\varepsilon = \begin{pmatrix} \varepsilon_{11} & \varepsilon_{12} \\ \varepsilon_{21} & \varepsilon_{22} \end{pmatrix}$$

where $\epsilon_{12} = \epsilon_{21}$ since $\vec{e}_1$ and $\vec{e}_2$ orthonormal basis set.

In a further preferred form of the opthalmic lens element of the present invention, the back surface may include an atoric component, which provides both the cylindrical correction and a cosmetic advantage.

In another form of the present invention, there may be provided a progressive ophthalmic lens element in the form of a front surface wafer for use with a back surface wafer. In this form of the present invention, the front surface wafer may have a front lens surface and a spherical back surface suitable for having laminated thereto the back surface wafer. The front lens surface of the front lens surface wafer may include an upper viewing zone having a surface power suitable for distance vision, a lower viewing zone having a surface power suitable for near vision, and a corridor of relatively low astigmatism connecting the upper and lower viewing zones, the corridor being part of an intermediate viewing zone having a surface power varying from that of the upper viewing zone to that of the lower viewing zone. The back surface wafer may then have a front surface suitable for lamination to the front surface wafer, and a back lens surface.

In this form of the invention, the front lens surface of the front surface wafer preferably includes at least one correction to improve optical performance of an ophthalmic lens formed by the lamination of the front and back surface wafers, by at least partially compensating for a cylinder correction applied to, or to be applied to, the back lens surface of the back surface wafer.

The present invention may also provide a method of designing an ophthalmic lens element. In a broad form, the method may include the step of providing a first mathematical or numerical representation of a front surface of an optical lens element, where the front surface includes an upper viewing zone having a surface power suitable for distance vision, a lower viewing zone having a surface power suitable for near vision, and a corridor of relatively low astigmatism connecting the upper and lower viewing zones. The corridor is thus a part of an intermediate viewing zone having a surface power varying from that of the upper viewing zone to that of the lower viewing zone. The method may then include the further step of modifying the representation of the front surface to at least partially adjust for a back lens surface bearing a cylinder correction.

In a preferred form, the method may include providing a mathematical or numerical representation of a front surface of a single vision optical lens element optimised to compensate for a back surface including a toric component, and then replacing the base curve of the front surface with the optimised representation of the single vision front surface to at least partially adjust for the cylinder correction on the back surface.

In particular, the present invention may provide a method of designing the ophthalmic lens element described above: the method including modifying the representation of the front surface to at least partially adjust for observed optical aberrations over the substantially entire aperture of the ophthalmic lens element; the method further including selecting a base surface function in the form of an n'th order symmetric polynomial:

$$z = \sum_{k=0,2,\ldots}^{n} \sum_{j=0,2,K}^{k} C_{k-j,j} x^{k-j} y^j;$$

selecting a merit function, M, relating to at least one optical aberration characteristic of the lens element that needs to be minimised;

computing the coefficients of the symmetric polynomial surface $C_{k-j,j}$ that minimise the merit function over the substantially entire aperture of the ophthalmic lens element;

applying this correction to the front surface;

modifying the addition power component of the front surface to take into account the change in base curve introduced by the correction; and fabricating an ophthalmic lens element having a back surface shaped according to the modified surface function.

The present invention may also provide a further method of designing an ophthalmic lens element such as that described above, the lens element including a front surface formed by providing a representation of a progressive lens surface in the form of a base surface function having.

an upper viewing zone providing good optical quality at a predetermined low surface power over a large area of vision; said predetermined power being determined by the viewers distance prescription, the horizontal fitting position normally being determined by the interpupillary distance of the wearer, and the vertical fitting position normally being determined by the vertical frame midpoint; a lower viewing zone of higher surface power determined by the viewer's near prescription requirements; and a corridor of relatively low astigmatism extending therebetween;

the lens element also including a back surface;

wherein the front surface is achieved through optical optimisation by minimising a merit function, M, to reduce optical blur and maximise the width of vision in the upper and lower viewing zones of the lens, thus forming a lens element having a front surface shaped by the merit function using finite element methods to solve the optical optimisation problem, such that the back surface includes the cylinder prescription requirements of the wearer during the optical optimisation.

As stated above, the design requirements for any progressive lens surface may differ based on whether the wearer is a myope, emmetrope, hyperope, or other category of patient, or may differ based on the lens base curve, distance prescription, or the level of addition power required by the wearer. Accordingly, the progressive ophthalmic lens element of the present invention may be a member of a series of such elements.

Such a progressive ophthalmic lens element series may be characterised in that lens elements from different sets having substantially the same addition power, having substantially the same optical field of vision in at least one of the upper and lower viewing zones. The progressive design may be provided on a single surface of the lens element.

Thus, the present invention may also provide a series of progressive ophthalmic lens elements, where each member of the series includes a front surface that includes an upper viewing zone having a surface power suitable for distance vision, a lower viewing zone having a surface power suitable for near vision, and a corridor of relatively low astigmatism connecting the upper and lower viewing zones, the corridor being a part of an intermediate viewing zone having a surface power varying from that of the upper viewing zone to that of the lower viewing zone. Each member of the series of lens elements also includes a back surface. The front surface then includes the at least one correction to improve the optical performance of the lens element by at least partially compensating for a cylinder correction applied to, or to be applied to, the back surface.

Preferably, each lens element within a set having an addition power between approximately 0.50 D to 3.50 D has substantially the same optical field of vision in the lower viewing zone for each category of patient.

In this respect, the applicant has shown that progressive lenses, where the surface has been optimised for a cylinder axis selected from 0°, 45°, 90° or 135°, exhibit substantial optical performance improvements over the entire range of cylinder axes. It has also been observed that a progressive lens surface optimised for a cylinder correction of −2.50 D results in substantial optical performance improvements when utilised for cases where the cylindrical correction ranges from −1.00 D to 4.00 D when compared with those optimised for the exact cylinder values.

Accordingly, a preferred example of such a product series includes, for a given base/add combination, a general progressive lens surface for 0.00 D cyl to −0.75 D of cylinder correction regardless of axis and four corrected surfaces used for the cylinder range of −1.00 D to −4.00 D, for axes of 0°, 45°, 90° and 135°.

The progressive ophthalmic lens element may be formed from glass or a polymeric article. The polymeric article, where applicable, may be of any suitable type. A polycarbonate, for example a material of the diallyl glycol carbonate type, may be used. The polymeric article may be formed from cross-linkable polymeric casting compositions, for example as described in U.S. Pat. No. 4,912,155. Such cross-linkable polymeric casting compositions may include a diacryiate or dimethacrylate monomer (such as polyoxyalkylene glycol diacrylate or dimethacrylate or a bisphenol fluorene diacrylate or dimethacrylate) and a polymerisable comonomer, e.g. methacrylates, acrylates, vinyls, vinyl ethers, allyls, aromatic olefins, ethers, polythiols and the like.

DETAILED DESCRIPTION OF PREFERRED EMBODIMENTS OF THE INVENTION

The present invention will now be more fully described with reference to the accompanying examples. However, it should be understood that the following description is illustrative only and should not be taken in any way as a restriction on the generality of the invention described above.

Figure 2:
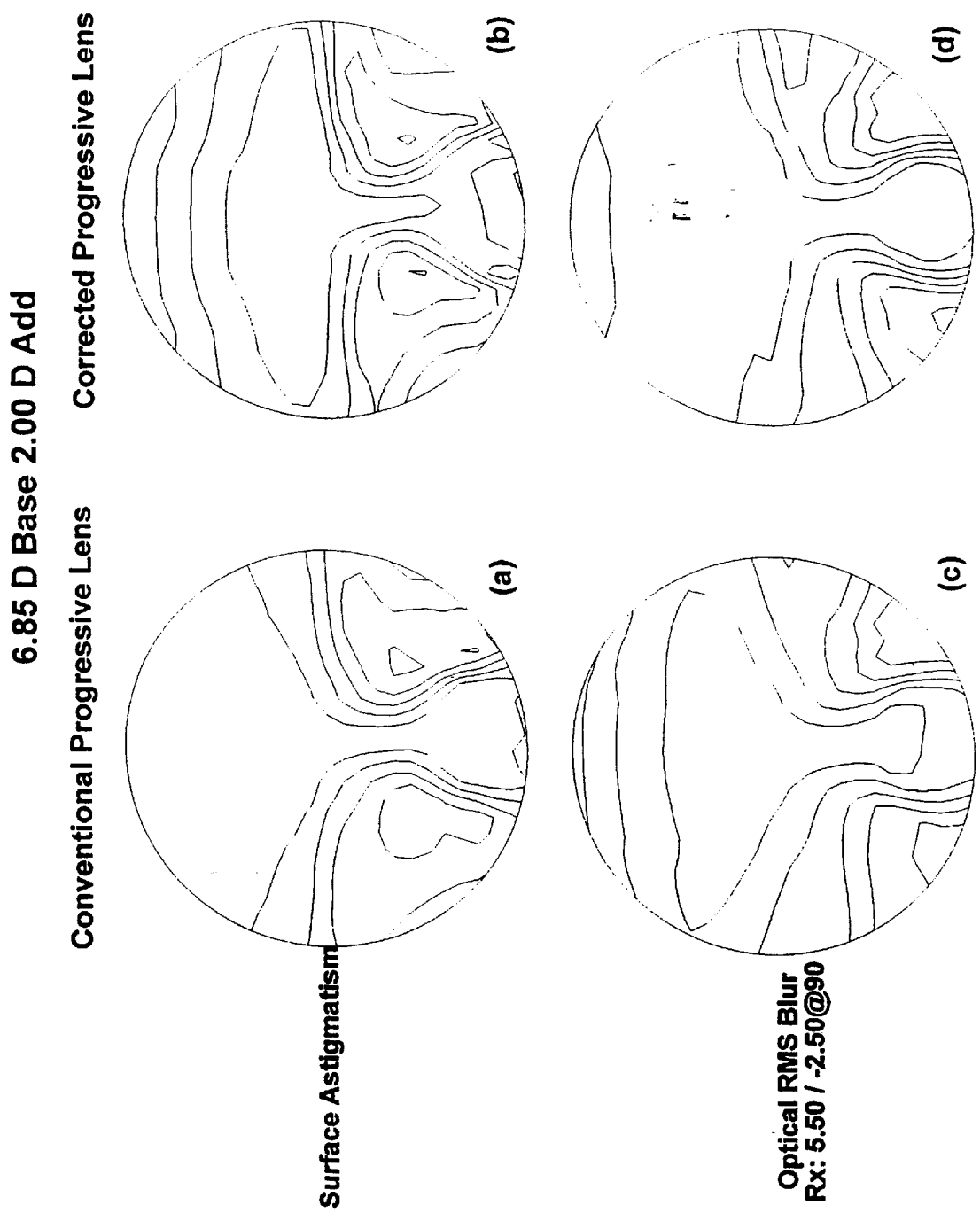

FIGS. 1 and 2 compare a conventional progressive lens and the progressive lens corrected according to the present invention for the −2.50 D cylinder prescription at two cylinder axis orientations, namely 180° and 90° respectively.

Figure 3:
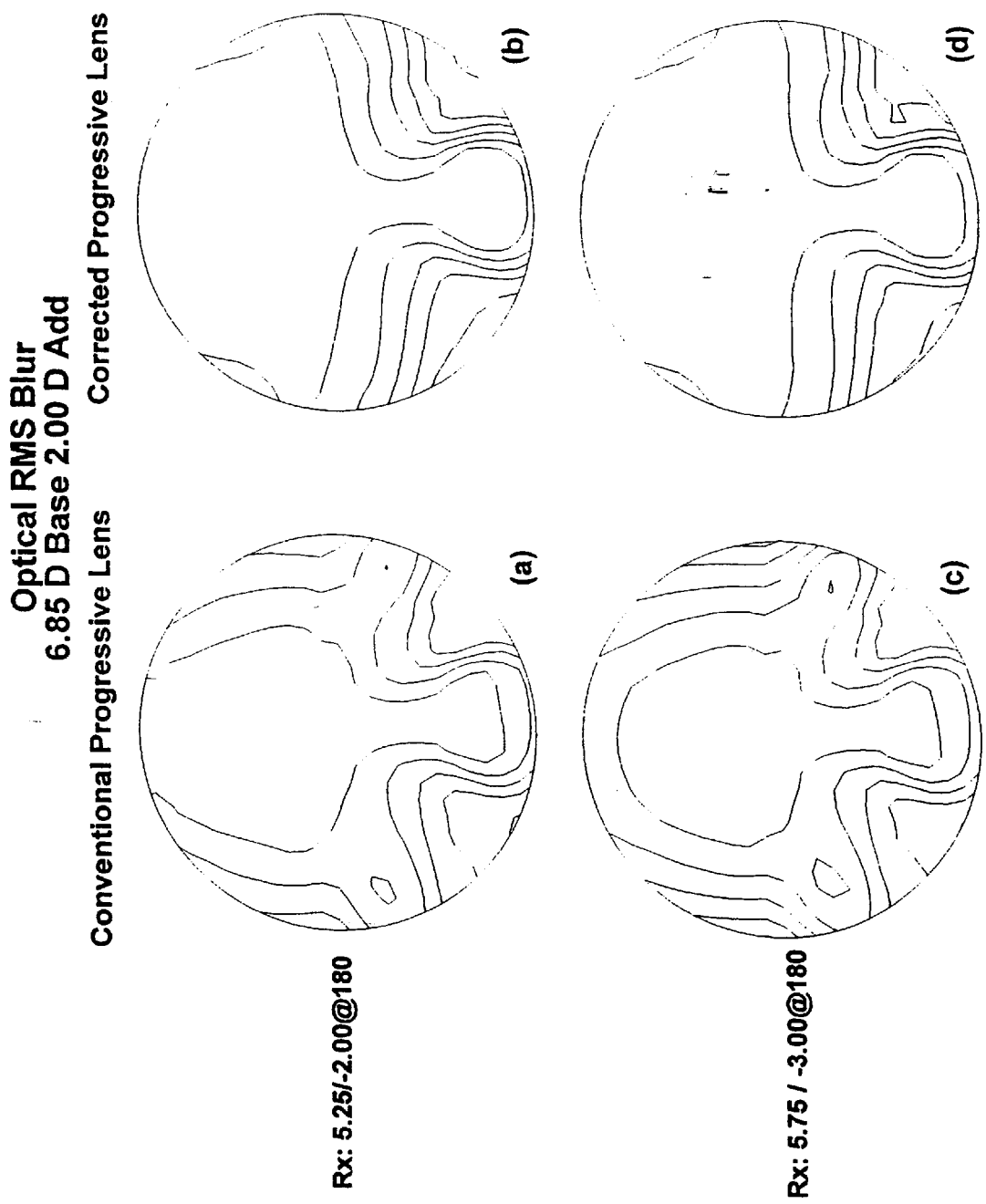

FIG. 3 shows a comparison of optical RMS blur contour plots of a conventional progressive lens and a progressive lens optimised for the −2.50 D at 180° of cylinder. In particular, FIGS. 3(a) and 3(c) show the conventional progressive with values of prescription −2.00 D and −3.00 D of cylinder respectively. FIGS. 3(b) and 3(d) show the progressive lens in accordance with the present invention for the same prescription values where the front surface is the surface which has been optimised for the −2.50 D at 180° of cylinder. All of the Figures contain contour levels of 0.5 D, 1.0 D, 1.5 D, 2.0 D, 2.5 D etc.

Describing the Figures in more detail, FIGS. 1 to 3 demonstrate two examples of the present invention. Each of the Figures contains 2×2 frames. The first column illustrates a conventional progressive lens with a rotationally symmetric base curve. The second column (FIG. 1(b), 1(d), 2(b) and 2(d)) shows a progressive lens in accordance with the present invention with a general aspheric base surface.

It should be noted that the Optical RMS Blur plots consider an object field that varies throughout the lens from infinity for the upper distance viewing zone region to approximately 40 cm in the lower, near viewing zone. In addition, for the calculation of RMS blur it was assumed the wearer could accommodate up to 0.50 D of power error for eye elevations below 10°. The distance between the centre of rotation of the eye and the lens back vertex was set to 27 mm and the lens material index was 1.537.

It should be further noted that the optimised surface of Column 2 may be achieved either by applying the correction surface or by direct calculation, utilising optical optimisation methods.

FIGS. 1 and 2 illustrate lenses of mean through power +4.25 D. In particular, FIG. 1 illustrates a lens with a base curve of 6.85 D and an addition power of 2.00 D. FIG. 1(a) illustrates the surface astigmatism of the conventional progressive, while FIG. 1(b) illustrates the surface astigmatism of the progressive surface corrected for the prescription requirements of +5.50 D and a cylinder axis of −2.50 D at 1800. FIG. 1(c) and FIG. 1(d) illustrate the RMS Blur that results with the conventional and corrected surfaces respectively for the prescription of +5.50 D and −2.50 D cylinder at 180°.

FIG. 2 illustrates a lens with a base curve of 6.85 D and an addition power of 2.00 D. FIG. 2(a) illustrates the surface astigmatism of the conventional progressive, while FIG. 2(b) illustrates the surface astigmatism of the progressive surface corrected for the prescription requirements of +5.50 D and a cylinder axis of −2.50 D at 90°. FIG. 2(c) and FIG. 2(d) illustrate the RMS Blur that results with the conventional and corrected surfaces respectively for the prescription of +5.50 D and −2.50 D cylinder at 90°.

The differences in the RMS blur contour demonstrate a significant improvement in the optical performance of the corrected lens. This is indicated by the reduction in RMS blur of FIG. 1(d) to that of FIG. 1(c), and likewise when comparing FIG. 2(d) and FIG. 2(c).

FIG. 3 illustrates the gains in optical performance for two cylinder prescriptions deviating from the optimised one.

It can be seen from these results that the surface corrected for −2.50 D of cylinder results in substantially improved performance for the examples given, when compared with the conventional progressive, and similar performance to the fully optimised example of FIG. 1(d).

Finally, it is to be understood that various other modifications and/or alterations may be made without departing from the spirit of the present invention as outlined herein.

What is claimed is:

1. A progressive ophthalmic lens element including:
   a front surface that includes an upper viewing zone having a surface power suitable for distance vision, a lower viewing zone having a surface power suitable for near vision, and a corridor of relatively low astigmatism connecting the upper and lower viewing zones, the corridor being a part of an intermediate viewing zone having a surface power varying from that of the upper viewing zone to that of the lower viewing zone; and
   a back surface;
   wherein the front surface includes at least one correction to improve optical performance of the lens element by at least partially compensating for a cylinder correction applied to, or to be applied to, the back surface.

2. A progressive ophthalmic lens element according to claim 1, wherein the back surface includes a cylinder correction in the form of a toric component to provide an astigmatic correction.

3. A progressive ophthalmic lens element according to claim 1, wherein the back surface includes a cylinder correction in the form of an atoric component to provide an astigmatic correction.

4. A progressive ophthalmic lens element according to any one of claims 1 to 3, wherein the front surface includes a general aspheric correction optimised for at least two principal lens meridional directions.

5. A progressive ophthalmic lens element according to any one of claims 1 to 3, wherein the front surface correction varies depending on the axis of the cylinder correction of the back surface.

6. A progressive ophthalmic lens element according to any one of claims 1 to 3, wherein the front surface correction varies depending on the distance Rx power, or covers a range of distance Rx powers.

7. A progressive ophthalmic lens element according to any one of claims 1 to 3 exhibiting differing cylinder corrections in at least the upper and lower viewing zones of the front surface, wherein the front surface correction varies depending on the addition power.

8. A progressive lens element according to any one of claims 1 to 3 wherein the front surface correction has been achieved by replacing a rotationally symmetric base curve with a general aspheric surface of the form of an n'th order symmetric polynomial: k $$z = \sum_{k=0,2,...}^{n} \sum_{j=0,2,...}^{k} C_{k-j,j} x^{k-j} y^j.$$

9. A progressive lens element according to any one of claims 1 to 3 wherein the front surface correction has been achieved by a method of optical optimisation where a suitably constructed merit function relating to the optical performance of the lens in the as worn eye-lens configuration is optimised for one or more of distance, intermediate, or near zone vision, depending on the Rx needs of the wearer.

10. A progressive lens element according to any one of claims 1 to 3, wherein the front surface correction is achieved by consideration of a merit function including an optimisation function to minimise optical blur where the optimisation function seeks to minimise a blur measure, M.

11. A method of designing an ophthalmic lens element, the lens element including a front surface having an upper viewing zone with a surface-power suitable for distance vision, a lower viewing zone having a surface power suitable for near vision, and a corridor of relatively low astigmatism connecting the upper and lower viewing zones, the corridor being a part of an intermediate viewing zone having a surface power varying from that of the upper viewing zone to that of the lower viewing zone; and
   modifying the representation of the front surface to at least partially adjust for
   modifying the representation of the front surface to at least partially adjust for observed optical aberrations over the substantially entire aperature of the ophthalmic lens element;
   wherein the method includes selecting a base surface function in the form of an n'th order symmetric polynomial:

$$z = \sum_{k=0,2,...}^{n} \sum_{j=0,2,K}^{k} C_{k-j,j} x^{k-j} y^i;$$

selecting a merit function, M, relating to at least one optical aberration characteristic of the lens element that needs to be minimised;
   computing the coefficients of the symmetric polynomial surface $C_{k-j,j}$ that minimise the merit function over the substantially entire aperture of the ophthalmic lens element;
   applying this correction to the front surface;
   modifying the addition power component of the front surface to take into account the change in base curve introduced by the correction; and
   fabricating an ophthalmic lens element having a back surface shaped according to the modified surface function.

12. A method of designing an ophthalmic lens element, said lens element including a front surface formed by providing a representation of a progressive lens surface in the form of a base surface function having:

an upper viewing zone providing good optical quality at a predetermined low surface power over a large area of vision; said predetermined power being determined by the viewer's distance prescription, the horizontal fitting position normally being determined by the interpupillary distance of the wearer, and the vertical fitting position normally being determined by the vertical frame midpoint; a lower viewing zone of higher surface power determined by the viewer's near prescription requirements; and a corridor of relatively low astigmatism extending therebetween;

the lens element also including a back surface;

wherein the front surface is achieved through optical optimisation by minimising a merit function, M, to reduce optical blur and maximise the width of vision in the upper and lower viewing zones of the lens, thus forming a lens element having a front surface shaped by the merit function using finite element methods to solve the optical optimisation problem, such that the back surface includes the cylinder prescription requirements of the wearer during the optical optimisation.

13. A series of progressive ophthalmic lens elements, each member of the series including:

a front surface that includes an upper viewing zone having a surface power suitable for distance vision, a lower viewing zone having a surface power suitable for near vision, and a corridor of relatively low astigmatism connecting the upper and lower viewing zones, the corridor being a part of an intermediate viewing zone having a surface power varying from that of the upper viewing zone to that of the lower viewing zone; and a back surface;

wherein the front surface includes at least one correction to improve optical performance of the lens element by at least partially compensating for a cylinder correction applied to, or to be applied to, the back surface.

14. A series of progressive lens elements according to claim 13, wherein the back surface includes a cylinder correction in the form of a toric component to provide an astigmatic correction.

15. A series of progressive lens elements according to claim 13, wherein the back surface includes a cylinder correction in the form of an atoric component to provide an astigmatic correction.

16. A series of progressive lens elements according to any one of claims 13 to 15, wherein the front surface includes a general aspheric correction optimised for at least two principal lens meridional directions.

17. A series of progressive lens elements according to any one of claims 13 to 15, wherein the front surface correction varies depending on the axis of the cylinder correction of the back surface.

18. A series of progressive lens elements according to any one of claims 13 to 15, wherein the front surface correction varies depending on the distance Rx power, or covers a range of distance Rx powers.

19. A series of progressive lens elements according to any one of claims 13 to 15 exhibiting differing cylinder corrections in at least the upper and lower viewing zones of the front surface, wherein the front surface correction varies depending on the addition power.

20. A series of progressive lens elements according to any one of claims 13 to 15, wherein the front surface correction has been achieved by replacing a rotationally symmetric base curve with a general aspheric surface of the form of an n'th order symmetric polynomial:

$$z = \sum_{k=0,2,\ldots}^{n} \sum_{j=0,2,\ldots}^{k} C_{k-j,j} x^{k-j} y^j.$$

21. A series of progressive lens elements according to any one of claims 13 to 15, wherein the front surface correction has been achieved by a method of optical optimisation where a suitably constructed merit function relating to the optical performance of the lens in the as worn eye-lens configuration is optimised for one or more of distance, intermediate, or near zone vision, depending on the Rx needs of the wearer.

22. A series of progressive lens elements according to any one of claims 13 to 15, wherein the front surface correction is achieved by consideration of a merit function including an optimisation function to minimise optical blur where the optimisation function seeks to minimise a blur measure, M.

23. A series of progressive lens elements according to any one of claims 13 to 15, wherein each lens element within a series having an addition power between about 0.50 D to 3.50 D has substantially the same optical field of vision in the lower viewing zone for each category of patient.

24. A series of progressive lens elements according to any one of claims 13 to 15, including for a given base/add combination, a general progressive lens surface for 0.00 D cyl to −0.75 D of cylinder correction regardless of axis, and four corrected surfaces using for the cylinder range of −1.00 D to −4.00 D, for axes of 0°, 45°, 90° and 135°.

25. A progressive ophthalmic lens element including:

a front surface wafer for use with a back surface wafer, the front surface wafer having a front lens surface and a spherical back surface suitable for having laminated thereto the back surface wafer, the front lens surface of the front lens surface wafer including an upper viewing zone having a surface power suitable for distance vision, a lower viewing zone having a surface power suitable for near vision, and a corridor of relatively low astigmatism connecting the upper and lower viewing zones, the corridor being part of an intermediate viewing zone having a surface power varying from that of the upper viewing zone to that of the lower viewing zone, and the back surface wafer having a front surface suitable for lamination to the front surface wafer, and a back lens surface;

wherein the front lens surface of the front surface wafer includes at least one correction to improve optical performance of an ophthalmic lens formed by lamination of the front and back surface wafers, by at least partially compensating for a cylinder correction applied to, or to be applied to, the back lens surface of the back surface wafer.

* * * * *